United States Patent
Wang et al.

(10) Patent No.: US 9,846,058 B2
(45) Date of Patent: Dec. 19, 2017

(54) NON-CONTACT POTENTIOMETER

(71) Applicant: MultiDimension Technology Co., Ltd., Zhangjiagang (CN)

(72) Inventors: Junyun Wang, Zhangjiagang (CN); Feng Wang, Zhangjiagang (CN); Xiaofeng Cheng, Zhangjiagang (CN); Yulin Dai, Zhangjiagang (CN)

(73) Assignee: MultiDimension Technology Co., Ltd., Zhangjiagang (CN)

( * ) Notice: Subject to any disclaimer, the term of this patent is extended or adjusted under 35 U.S.C. 154(b) by 162 days.

(21) Appl. No.: 14/781,504

(22) PCT Filed: Apr. 1, 2014

(86) PCT No.: PCT/CN2014/074557
§ 371 (c)(1),
(2) Date: Sep. 30, 2015

(87) PCT Pub. No.: WO2014/161477
PCT Pub. Date: Oct. 9, 2014

(65) Prior Publication Data
US 2016/0041008 A1    Feb. 11, 2016

(30) Foreign Application Priority Data
Apr. 1, 2013    (CN) .................... 2013 2 0158412 U

(51) Int. Cl.
*G01B 7/14* (2006.01)
*G01C 9/00* (2006.01)
(Continued)

(52) U.S. Cl.
CPC ............... *G01D 5/16* (2013.01); *G01D 5/145* (2013.01)

(58) Field of Classification Search
CPC .................... G01D 5/16; G01D 5/145
(Continued)

(56) References Cited

U.S. PATENT DOCUMENTS

| 2003/0173952 A1* | 9/2003 | Niwa ..................... G01D 3/036 324/207.16 |
| 2011/0043197 A1* | 2/2011 | Trontelj ................. G01D 5/145 324/207.25 |

FOREIGN PATENT DOCUMENTS

| CN | 1464972 | 12/2003 |
| CN | 102549386 | 7/2012 |

(Continued)

OTHER PUBLICATIONS

"International Application No. PCT/CN2014/074557, International Search Report dated Jun. 11, 2014", (Jun. 11, 2014), 5 pgs.

*Primary Examiner* — Farhana Hoque
(74) *Attorney, Agent, or Firm* — Schwegman Lundberg & Woessner, P.A.

(57) ABSTRACT

The present invention relates to a non-contact potentiometer. The non-contact potentiometer comprises the following parts: a mechanical housing with through-holes; a rotating shaft comprising a top end and a magnet end on which a permanent magnet is fixed and external torque can be applied to the top end, thus driving the rotating shaft and the permanent magnet to rotate around a rotation axis and relative to the housing; a magnetoresistive sensor assembly fixed inside the housing, comprising one or more sensor chips, the sensitivity axis of the sensor chips lies in a sensing plane that is perpendicular to the axis of the rotating shaft, and separated from the permanent magnet by a predetermined distance in the direction parallel to the axis of the rotating shaft, said sensors are used for sensing the magnetic variation produced as the permanent magnet rotates with the rotating shaft thereby generating sensing signals; and three (Continued)

electrical connection terminals, namely a ground terminal, a power terminal, and a signal output terminal. This non-contact potentiometer has the advantages of high precision, low power consumption, and low cost. Additionally, it converts the complex analog signal from the magnetic sensor into a standard digital format that is easy to use.

20 Claims, 8 Drawing Sheets

(51) Int. Cl.
*G01D 5/16* (2006.01)
*G01D 5/14* (2006.01)

(58) Field of Classification Search
USPC .................. 324/207.21, 207.15; 702/151
See application file for complete search history.

(56) References Cited

FOREIGN PATENT DOCUMENTS

| | | | | |
|---|---|---|---|---|
| CN | 202693004 | * | 1/2013 | ............... G01D 5/12 |
| CN | 203260444 | | 10/2013 | |
| WO | WO-2014/161477 | | 10/2014 | |

* cited by examiner

NON-CONTACT POTENTIOMETER

PRIORITY CLAIM TO RELATED APPLICATIONS

This application is a U.S. national stage application filed under 35 U.S.C. §371 from International Application Serial No. PCT/CN2014/074557, which was filed 1 Apr. 2014, and published as WO2014/161477 on 9 Oct. 2014, and which claims priority to Chinese Application No. 201320158412.9, filed 1 Apr. 2013, which applications and publication are incorporated by reference as if reproduced herein and made a part hereof in their entirety, and the benefit of priority of each of which is claimed herein.

TECHNICAL FIELD

The present invention relates to the technical field of potentiometers, and more particularly to a non-contact potentiometer capable of converting mechanical movement into an electrical signal.

BACKGROUND TECHNOLOGY

In the prior art, potentiometers typically include three terminals, two of the terminals are fixed, and the remaining terminal can be moved. The moving terminal of a potentiometer is often called the third terminal. The range of the electrical signal output from the third terminal of a potentiometer is controlled by the input electrical signal potentiometer. A potentiometer's input electrical signal is typically either a voltage difference or a current provided by a source.

In one embodiment of a prior art potentiometer, the potentiometer comprises a cylinder, uniformly wound with a single layer wire, the cylinder side is exposed, the top and bottom of the cylinder are each provided with a terminal, the input voltage to the potentiometer is provided across the top and bottom terminals. The third terminal of the potentiometer is a metal stylus, where the metal stylus can slide up and down along the cylinder surface, and the wire wound on the cylinder is in contact with the stylus. The metal stylus voltage depends on the metal stylus position as it slides along the cylinder. The length of the wire is proportional to the total resistance of the potentiometer and the wire diameter is inversely proportional to the resistance. This potentiometer is also often referred to as a 'wire-wound rheostat'.

In another embodiment of a prior art potentiometer, the potentiometer comprises a flat film has two terminals and narrow conduction band pattern on the film plate. A third terminal of the potentiometer in direct electrical contact with the film flat, and voltage of the third terminal depends on the position of the third terminal depends on the electrical contact position on the thin film. This potentiometer can be used to detect linear motion and angular motion.

In practice, these two potentiometer implementation types have some disadvantages. The third terminal of the two potentiometer types must move along the resistive element within the potentiometer, while maintaining good electrical contact is maintained between the third terminal and the resistive element of the potentiometer. However, long term use is complicated by contact corrosion, physical wear and tear, and loose wires; such that a potentiometer using mechanical components for a third terminal will show degraded electrical performance over time. There is a need for a mechanical device that can measure mechanical motion with improved reliability over the common potentiometer.

Unfortunately, the wear mechanism is unavoidable in these mechanical devices. Accordingly, there is a need for a non-contact potentiometer, where the non-contact potentiometer third terminal does not need to come in direct contact with the conductive element in order to determine the position of the slider.

In the prior art, non-contact potentiometers often include a magnetic sensor and a magnet instead of a third terminal, the magnetic sensor in these devices detects the relative movement and position of the magnet. The magnetic sensor used for prior art contactless potentiometers is often a Hall Effect, an anisotropic magnetoresistance (AMR), or a giant magnetoresistance (GMR) sensor. The magnetic sensor for non-contact potentiometers can also be an inductive coil magnetic sensor. Inductive coil magnetic sensors operate by sending and receiving electromagnetic signals at a given frequency in the presence of a movable soft ferromagnetic component, and then determining the position of the soft magnetic component through algorithms and calibration. This type of non-contact type potentiometer is also known as a linear variable differential transformer (LVDT). This type of non-contact potentiometer solves wear problems during prolonged use.

However, this type of prior art non-contact potentiometer has poor precision, high power consumption, high cost, and added complexity due to the need for a circuit to convert the analog sensor signal into a digital signal.

SUMMARY OF THE INVENTION

The purpose of the present invention is to provide a non-contact potentiometer.

The non-contact potentiometer of the present invention comprises:

A mechanical housing through which a rotating shaft passes, wherein the rotating shaft has a top end that can accept mechanical torque and a magnet attached to the bottom end, and the magnet rotates with respect to the housing around the axis of rotation;

It further comprises one or more magnetoresistive sensor chips fixed with respect to the housing, the sensor chips have a sensing axis in the plane that is perpendicular to the axis of rotation, and the sensor chips are placed at a predetermined distance away from the end of the shaft with the permanent magnet displaced along a line parallel to the rotation axis, such that when said permanent magnet rotates about said axis of rotation its magnetic field changes, inducing a signal;

Three terminals: a ground terminal, a power supply terminal, and an output signal terminal.

Preferably, the permanent magnet's magnetization is oriented in a direction perpendicular to the axis of rotation of the shaft.

Preferably, the magnetoresistive sensor assembly includes two sensors, and the sensitivity axes of the two sensors are orthogonal to each other, and perpendicular to the axis of rotation.

Preferably, by using positioning pins, the rotation of the shaft about the axis of rotation is limited to an angular range of less than 360°.

Preferably, the rotating shaft includes a slot cut perpendicular to rotating shaft axis, and the slot holds a retainer ring, such that the shaft may only move rotationally about its axis.

Preferably, the housing of the magnetoresistive assembly comprises a bottom plate in addition to the cylindrical housing that limits the motion of the shaft.

Preferably, the non-contact potentiometer further comprising a magnetoresistive sensor assembly coupled to a control circuit, so that the sensing signal can be converted into a pulse-width modulated output waveform, wherein the duty-cycle of the waveform is proportional to the rotation angle of the shaft.

Further, the control circuit includes a power supply control circuit chip such as a SP6201, a microcontroller such as a C8051F912 microcontroller, a preamplifier chip such as LMV324, and a MMA243 magnetic sensor chip.

The present invention has the following beneficial effects:

The present invention provides a non-contact precision potentiometer with good performance, low power loss, and low cost, and it can be faster and easier to use because the complex analog signal containing the magnetic field information is converted into a standard digital signal.

DESCRIPTION OF THE PREFERRED EMBODIMENTS

Embodiments of the present invention to be further described in conjunction with the accompanying drawings provided below.

Example 1

Figure 1:
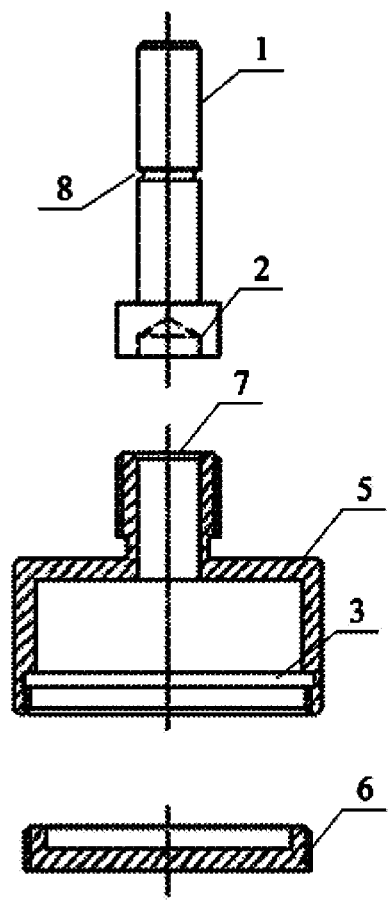
FIG. 1 is a cross-sectional view of implementation example 1 of the non-contact potentiometer in disassembled state.
Figure 2:
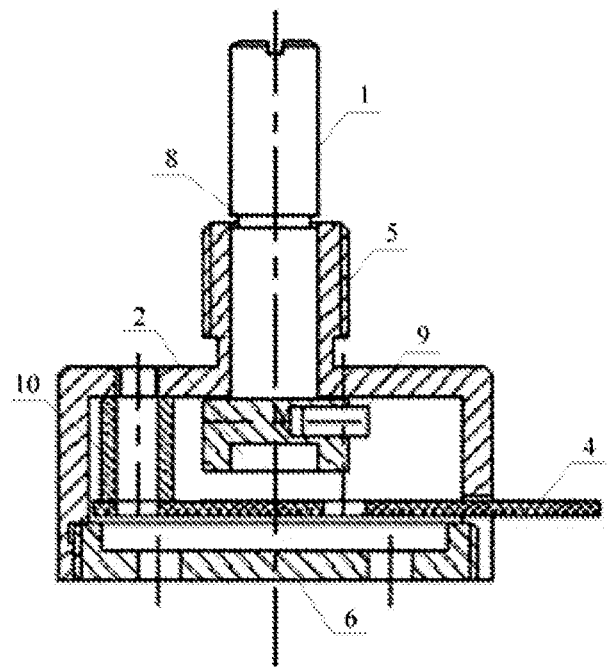
FIG. 2 is a cross-sectional view of implementation example 1 of the non-contact potentiometer in the fully assembled state.

FIGS. 1 and 2, present an embodiment of the present invention that provides a non-contact type potentiometer including a rotatable shaft 1, a permanent magnet 2, a sensor chip 3, a printed circuit board (PCB) 4, a housing 5, a cover 6, and a control circuit module. Housing 5 has a convex shape, hollow inside, with a bottom opening. The top of housing 5 is provided with a through-hole 7. The rotating shaft 1 is provided with a central recess 8, and a rotating shaft has a bottom cavity 9. Permanent magnet 2 is placed on the rotating shaft 1 in the cavity 9, such that the permanent magnet 2 can be rotated with the rotating shaft 1. In this embodiment, the permanent magnet 2 may be disc-shaped. The rotating shaft 1 is placed through hole 7 in housing 5, the rotating shaft is fixed in the middle of through-hole 7 using groove 8, such that rotation of the lever 1 may be rotated relative to the base 5. The portion of the rotating shaft 1 with cavity 9 is below the groove 8 and located within a base 5, the remaining portion of the rotating lever 1 is positioned outside the base 5. There is a connecting post 10 located on the inner wall of the upper end of the base 5. Printed circuit board 4 is connected to connecting posts 10, thereby permitting the printed circuit board 4 to protruding from the top surface of housing 5. The sensor chip 3 is fixed to the printed circuit board 4, and the position of the sensor chip 3 aligns with the inner cavity 9 where the permanent magnet 2 is located. The sensor chip 3 is placed at an appropriate distance from the permanent magnet 2, such that the sensor chip 3 operates in its linear range. Cover 6 is provided on the bottom of the housing 5, for closing an opening at the bottom of the base 5.

Figure 3:
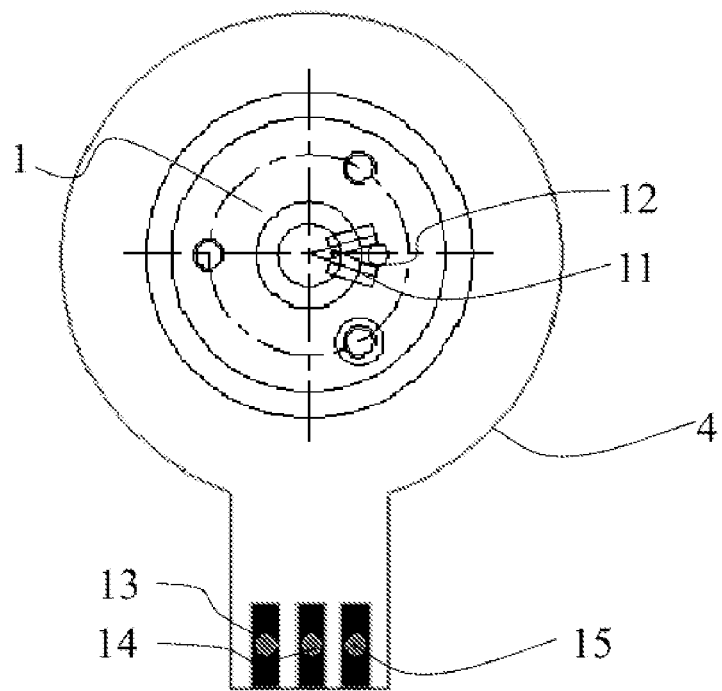
FIG. 3 is a top-down view of implementation example 1 of the non-contact potentiometer

As shown in FIG. 3, preferably, the outer wall of a rotating shaft has pin 11, and the housing 5 is provided with positioning pin 12. When the rotating shaft 1 is rotated relative to the base 5, and the pin 11 is rotated to a position where contacting positioning pin 12, the positioning pin 12 can stop pin 11, so that the rotating shaft 1 is rotated relative to the housing 5 by an angle in the range of 0-360°. Printed circuit board 4 is provided with three pads, namely a first pad 13, second pad 14, and third pad 15, and the first pad 13, second pad 14 and the third base pad 15 are located externally to housing 5, wherein the first pad 13 is electrically connected to the power supply (not shown); the second pad 14 ground pad; and, third pad 15 is a signal output terminal for outputting a pulse width modulation (PWM) digital signal.

Preferably the non-contact potentiometer of the present embodiment features a rotating shaft 1 with recess 8 in which an O-ring, circlip or plastic slide disk, is inserted to insure that rotation shaft 1 can only be rotated relative to the housing 5, and it cannot move in a direction parallel to the rotational axis 101.

Figure 4:
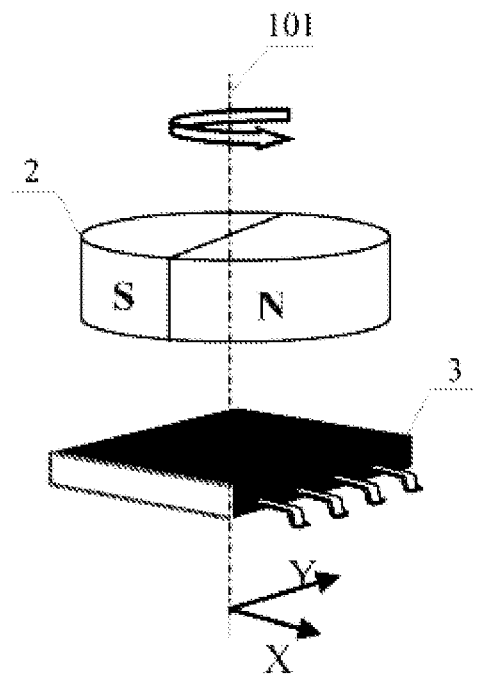
FIG. 4 is a three dimensional representation of the placement of the permanent magnet and the sensor chip of non-contact potentiometer implementation example 1.
Figure 5:
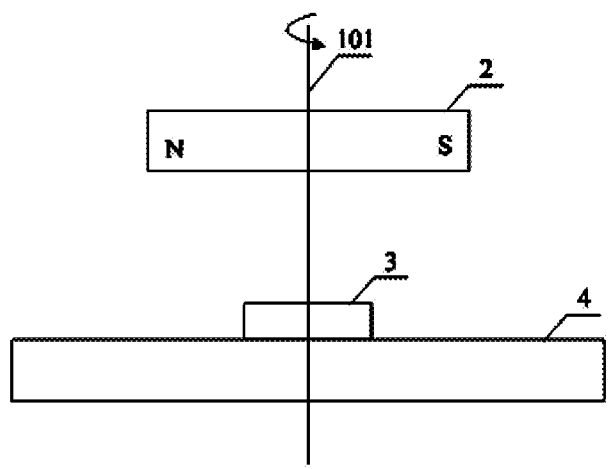
FIG. 5 is a cross-sectional view showing the placement of the permanent magnet and the sensor chip of non-contact potentiometer implementation example 1.
Figure 6:
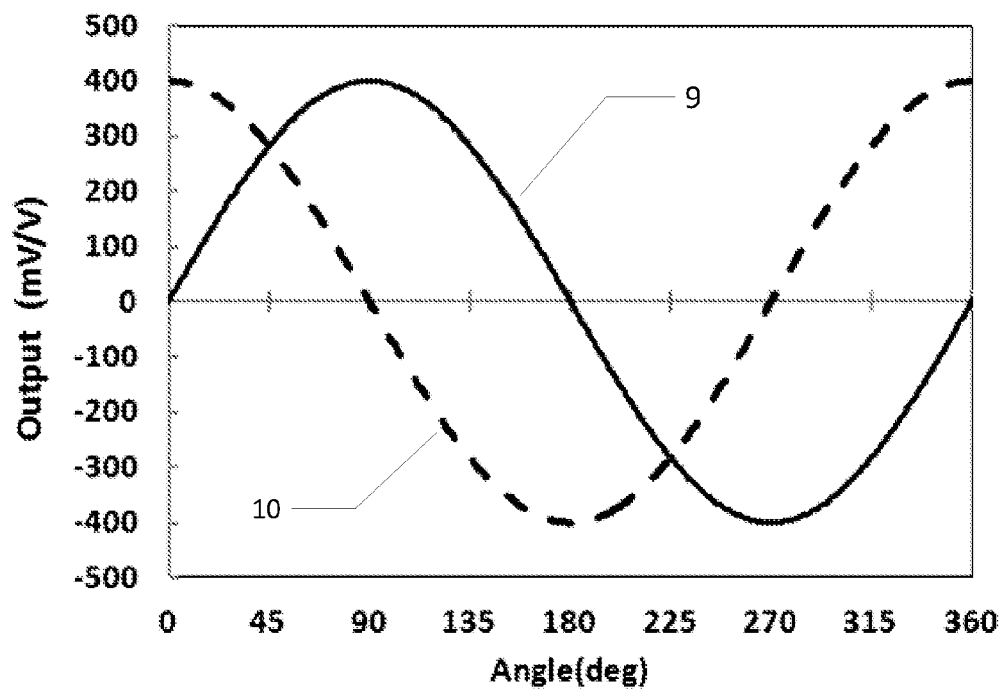
FIG. 6 is a plot showing the output voltage of the sensor as a function of the permanent magnet rotation angle for non-contact potentiometer implementation example 1.

Sensor chip 3 includes two magnetic sensors (not shown in the figure), and these two sensors are positioned perpendicularly to the rotation axis 101, and the sensing axes of the tow sensors are orthogonal to each other in the plane of the sensor chip 3. As shown in FIGS. 4 and 5, in the present embodiment the rotating shaft 101 is parallel to the Z-axis direction, and the sensor chip's 3 two magnetic sensors 3 have sensitive directions that are parallel to the X-axis and Y-axis directions. The magnetization direction of the permanent magnet 2 shown in FIG. 3 and FIG. 4 pole is indicated with a N-pole and a S-pole, i.e., the magnetization direction of the permanent magnet 2 is perpendicular to the rotational axis 101. As shown in FIG. 6, when the permanent magnet 2 is rotated about the rotational axis 101 the magnetic field along the X-axis and Y-axis directions of magnetic field sensor chip 3 has sine curve 9 and cosine curve 10 respectively as a function of the angle of rotation.

Figure 7:
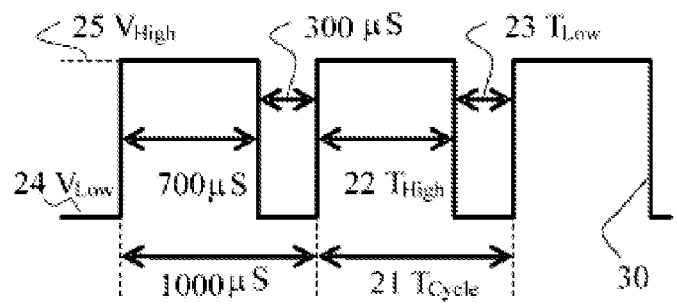
FIG. 7 is a diagram of a pulse width modulated output signal waveform.

The two sensors on sensor chip 3 are used to measure the change in amplitude of the magnetic field generated by permanent magnet 2 and to provide an analog voltage signal, and the analog voltage signal of the two sensors on sensor chip 3 has a linear relationship with the applied magnetic field. When the sensor chip 3 is operating in the linear range, the sensor chip 3 output voltage signal of the two sensors are linearly proportional to the X-axis and Y-axis components of the applied magnetic field. The analog voltage signals of the two sensors on sensor chip 3 can be directly connected to an analog-to-digital converter (ADC) in order to convert them into a digital signal. In the present embodiment, the digital signal of the analog to digital converter is then converted to a pulse width modulation PWM (Pulse width modulation) digital signal, the waveform of which is shown in FIG. 7, where the horizontal axis represents time, waveform 30 is a fixed period $T_{cycle}$ 21 periodic function. Voltage waveform 30 has values of $V_{Low}$ 24 and $V_{High}$ 25. In each cycle, voltage waveform 30 is at value $V_{High}$ 25 for time $T_{High}$ 22, and at voltage $V_{Low}$ 24 for time $T_{Low}$ 23. Here, $T_{High}$ 22 and $T_{Low}$ 23 are 700 microseconds and 300 microseconds, respectively, and $T_{Cycle}$ 21 is 1000 microseconds. The ratio of $T_{High}$ 22 and $T_{Cycle}$ 21 is called the 'duty cycle.' In this case, FIG. 7 shows the waveform output duty cycle 30 is 70%. PWM digital signal represents conversions between high and low values, and provides a digital signal representing duration in the high and low states. The PWM duty cycle of the digital signal is proportional to the rotation angle of the permanent magnet 2.

Figure 8:
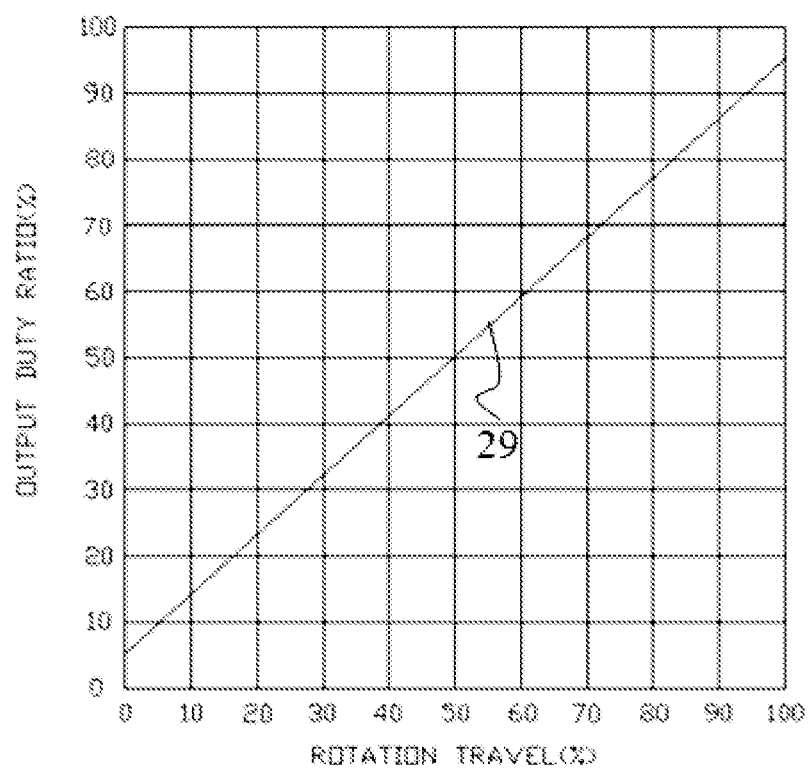
FIG. 8 is a graph showing the relationship between the duty cycle of the PWM waveform rotation angle.

FIG. 8 shows a curve representing the called the output duty ratio as a function of rotational angle (that is rotating shaft 1 ratio of the current angle to the maximum angle) which is the same as the pulse width modulation (PWM), and this is computed using a custom-designed circuit that converts the sinusoidal waveforms 9 and 10 of FIG. 6 into the line 29. Therefore, PWM is used to convert an irregularly shaped analog signal with arbitrary amplitude into a standard digital waveform.

The noncontact potentiometer according to an embodiment of the present invention comprises a control circuit module consisting of a microcontroller 51, a clock circuit 52, a voltage regulator 61, a sensor chip circuit 62, a preamplifier unit 63, and a connector unit 64. The control circuit module is used to detect the magnetic field using sensor chip 3 and convert it to an electrical signal output.

Figure 9:
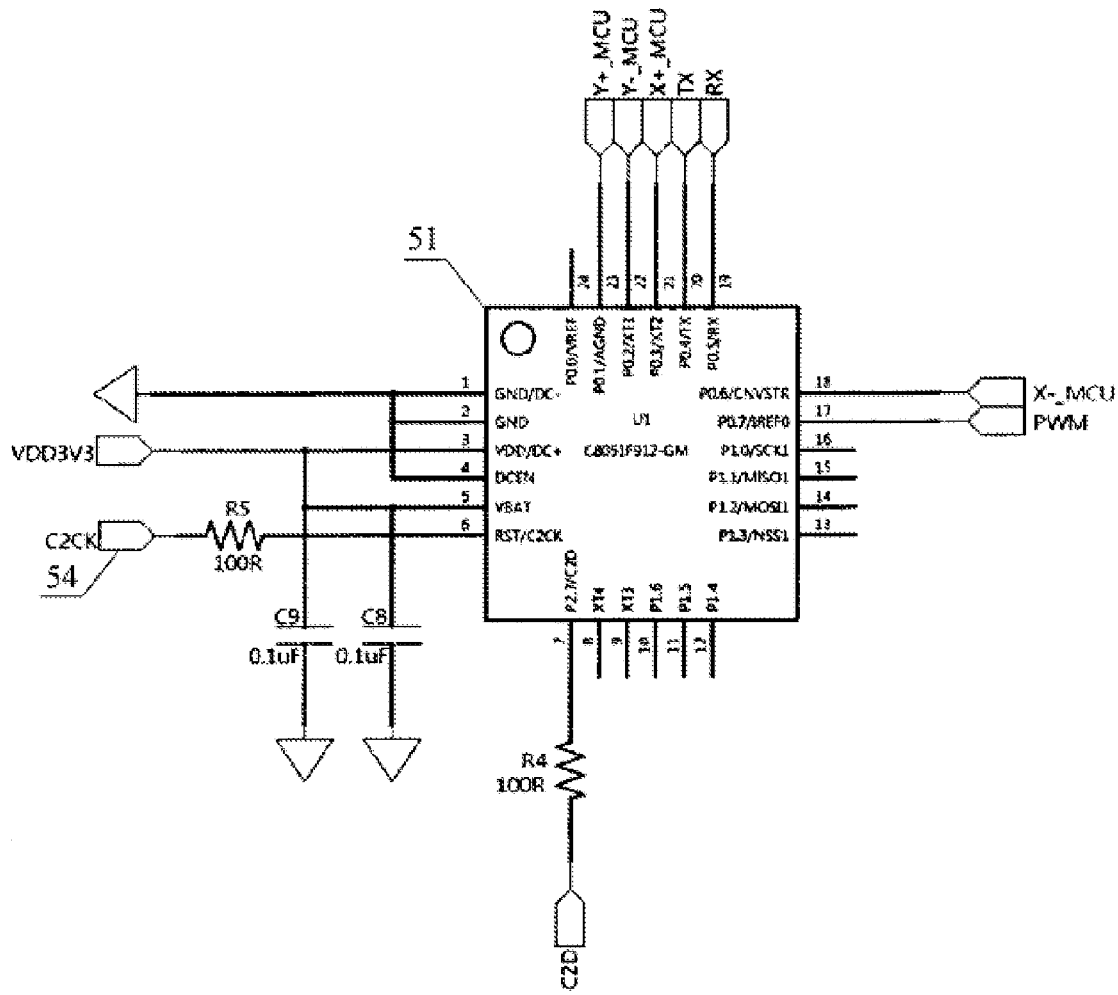
FIG. 9 shows the circuit diagram of the microcontroller of implementation example 1 of the non-contact potentiometer.

As shown in FIG. 9, microcontroller 51 has peripheral circuit components including a first resistor R4, a second resistor R5, eighth capacitor C8 and ninth capacitor C9 in a conventional manner secured to the printed circuit board 4.

In order to amplify the input signals 70-73 and convert them into an output PWM signal 75, the microcontroller 51 as follows: First, the analog signal through of the X-axis and Y-axis sensor output of the sensor is converted to a digital signal using an analog-digital converter (ADC); Second, an algorithm in a digital circuit calculates the angular position of the rotating shaft based on the converted digital signal; and third, to generate a PWM waveform with duty cycle proportional to the rotation angle of 2. The PWM waveform generated by the microcontroller 51 is sent to the output terminal 75, terminal 75 is electrically connected to the printed circuit board 4 third pad 15.

Figure 10:
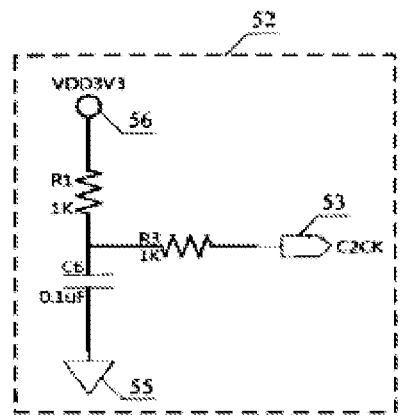
FIG. 10 shows the circuit diagram of the clock circuit of implementation example 1 of the non-contact potentiometer.

FIG. 10 shows the clock circuit 52 which is also secured to the printed circuit board 4. Clock circuit 52 has output C2CK 53 that is electrically connected to the C2CK 54 connector of the microcontroller 51. Clock circuit 52 VDD3V3 56 for providing a voltage 3.3 V. The clock circuit 52 has a ground terminal 55, and the ground terminal is electrically connected to the other circuits. The clock circuit 52 below the cutoff frequency produces an oscillating voltage signal, and the system can provide a timing signal to other circuits.

Figure 11:
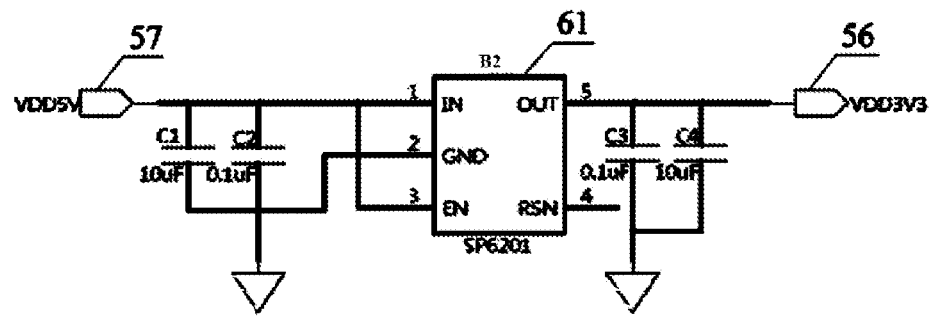
FIG. 11 shows the circuit diagram of the voltage regulator circuit of implementation example 1 of the non-contact potentiometer.

As shown in FIG. 11, the power regulator 61 for reducing the 5 volt VDD5V 57 from a non-steady-state voltage level, and for outputting a stable 3.3 volts to the connecting member VDD3V3 56. Peripheral component power regulator of a first capacitor C1, a second capacitor C2, the third capacitor C3 and the fourth capacitor C4 are fixed to the printed circuit board 4. The power regulator 61 provides a regulated voltage to sensitive electronic devices.

Figure 12:
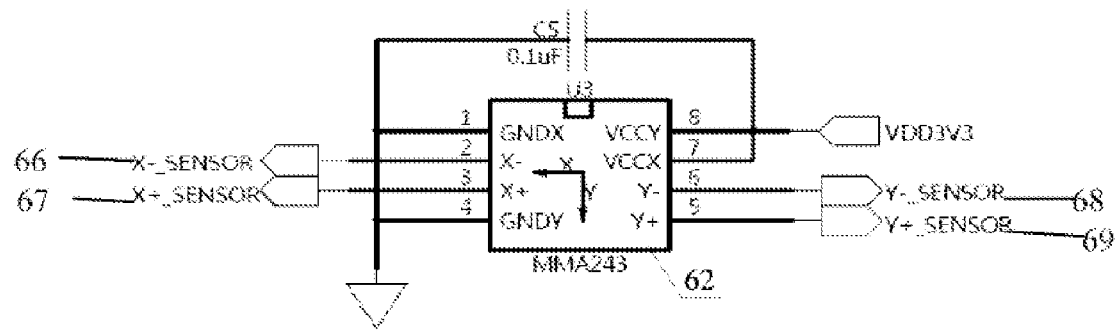
FIG. 12 shows the circuit diagram of the sensor chip of implementation example 1 of the non-contact potentiometer.

As shown in FIG. 12, the sensor chip circuit 62 provides voltage bias for the sensor chip 3 between node VDD3V3 56 and the ground terminal 55. The output voltage of sensor chip 3 is for the X-axis sensor measured between X−_SENSOR 66 and X+_SENSOR 67, while the voltage for the Y sensor is measured between Y−_SENSOR 68 and Y+_SENSOR 69. These voltage signals are represent the X axis sensor and the Y-axis sensor outputs shown by curves 9 and 10 in FIG. 6. Peripheral circuitry to the sensor chip 62 is connected through C5 to the printed circuit board 4. The sensor chip circuit 62 converts an external magnetic field into an electronic voltage signal.

Figure 13:
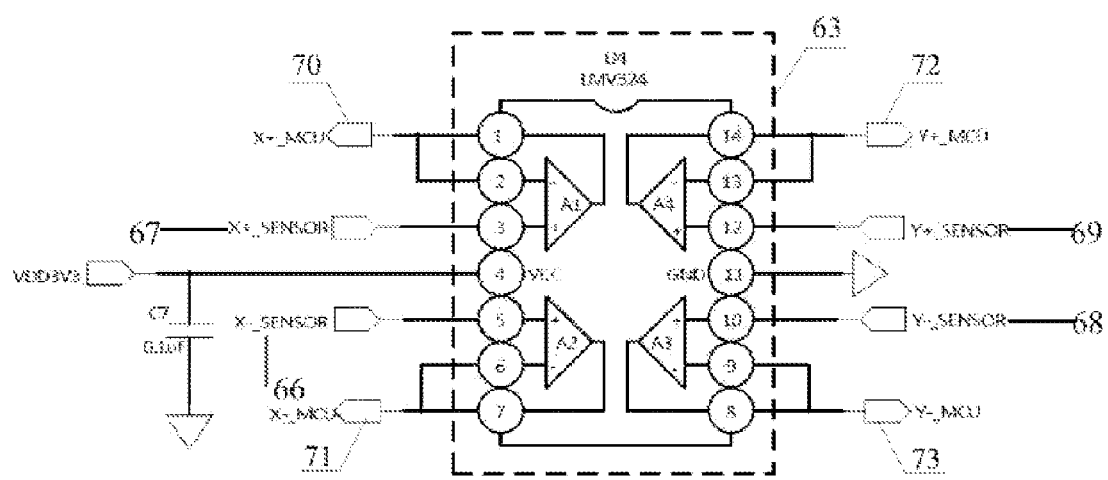
FIG. 13 shows the circuit diagram of the preamplifier unit of implementation example 1 of the non-contact potentiometer.

As shown in FIG. 13, preamplifier 63 is powered by connecting it from element VDD3V3 56 to ground 55. The preamplifier unit comprises 4 preamplifiers; each of the four preamplifiers receives an input signal from sensor chip circuit 62. The four amplified output signals are connected to nodes X+_MCU 70, X−_MCU 71, Y+_MCU 72, and Y−_MCU 73, and the output signals 70-73 of preamplifier unit 63 are electrically connected electrically to the corresponding node of microcontroller 51. Preamplifier 63 is located adjacent to the sensor to increase the amplitude of the analog electronic signals.

Figure 14:
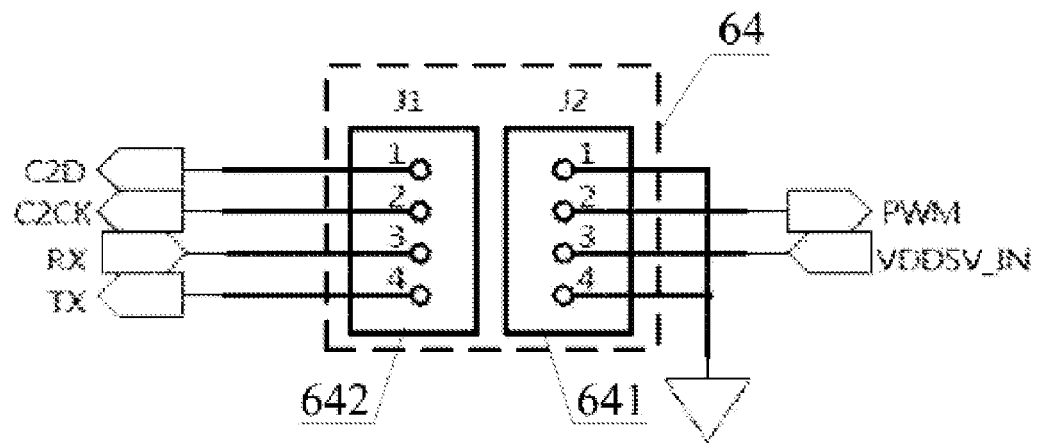
FIG. 14 shows the circuit diagram of the connector unit of implementation example 1 of the non-contact potentiometer.

As shown in FIG. 14, the connector unit 64 includes an external connector 641 and the internal connector 642, which may be electronic input and output connections set to the appropriate position, shown in the figure as a 4-wire connection.

In this embodiment, the non-contact potentiometer has the same cylindrical shape as potentiometers in the prior art. Therefore, in practice, the non-contact potentiometers in this embodiment can be used as an alternative for prior art cylindrically shaped potentiometers.

Example 2

Figure 15:
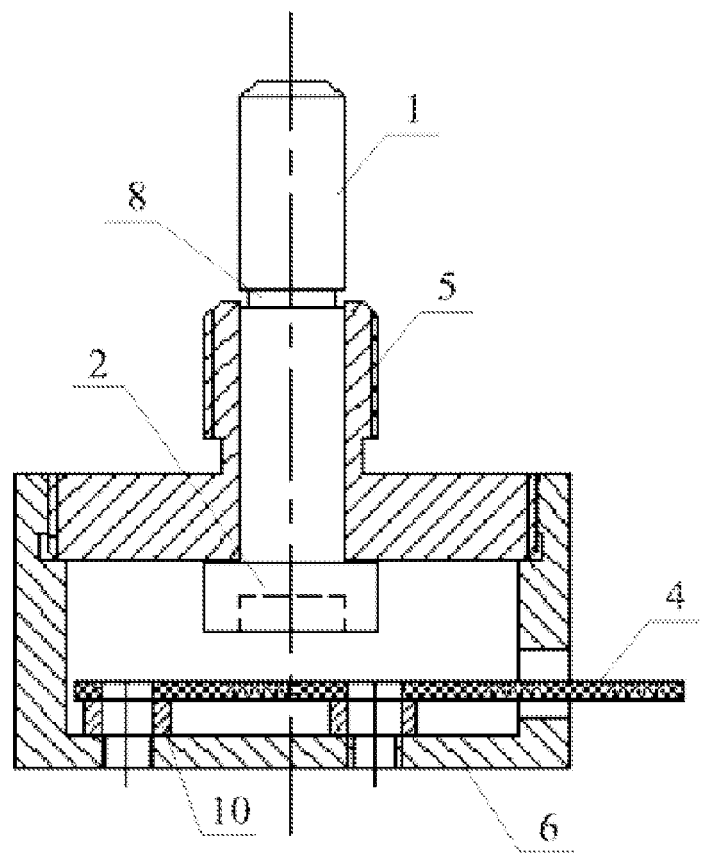
FIG. 15 is a cross-sectional view of implementation example 2 of the non-contact potentiometer in the fully assembled state.

FIG. 15 shows an alternative embodiment of a non-contact potentiometer distinct from example 1 in the following manner: cover plate 6 is equipped with two connecting posts 10, and printed circuit board 4 is fixed to connecting posts 10, otherwise, the design is the same as that in example 1.

It should be understood that the above detailed description of the technical implementation of the present invention of the preferred embodiments are meant to be illustrative but not restrictive. A person of ordinary skill in the art upon reading the present specification can modify the embodiments, or to some technical features equivalent replacements, based on the technical solutions described herein; and such modifications or replacements of the appropriate technical solutions of the various embodiments of the present invention do not depart from the spirit and scope of the present invention.

The invention claimed is:

1. A non-contact potentiometer, comprising:
   a mechanical housing with through-holes;
   a rotatable shaft, including a top end and a magnetic end with a fixed permanent magnet, the top end configured to accept an external torque, to turn the rotatable shaft and the permanent magnet about a rotational axis with respect to the housing;
   a pin used to limit the rotation of the shaft to less than 360°;
   a magnetoresistive sensor assembly on a printed circuit board fixed with respect to the housing, including one or more sensor chips, the sensor chips have a sensitivity axis in the plane perpendicular to the axis of rotation, and along the direction parallel to the axis of rotation, the permanent magnet is separated from the sensor chip by a predefined distance, the sensor chip senses the magnetic field of the permanent magnet as it rotates about the axis of rotation and produces a signal;
   an electronic sensor control circuit on the printed circuit board used to convert the value of the detected magnetic field into an electronic signal, the electronic sensor control circuit including the power control circuit, a clock circuit, a microcontroller and a preamplifier circuit; and
   three electrical terminals on a portion of the printed circuit board that protrudes from the housing, the three terminals including a ground terminal, a power supply terminal, and the signal output terminal.

2. The non-contact potentiometer according to claim 1, further comprising:
   a magnetization direction in the interior of the permanent magnet perpendicular to the axial direction of the rotating shaft.

3. The non-contact potentiometer according to claim 1, further comprising:
   two sensors in the magnetoresistive sensor assembly, where sensitivity axes of the two sensors are orthogonal to each other, and perpendicular to the axis of rotation.

4. The non-contact potentiometer according to claim 1, further comprising:
   a groove cut around the periphery of the rotatable shaft in a direction perpendicular to the axis of rotation, and a retaining clip disposed in the groove to restrict the motion of the rotatable shaft to be only about the axis of rotation.

5. The non-contact potentiometer according to claim 1, wherein the housing that limits the rotational motion of the rotatable shaft has a bottom plate for the cylindrical housing to which the magnetoresistive sensor assembly is fixed.

6. The non-contact potentiometer according to claim 1, wherein the non-contact potentiometer magnetoresistive sensor assembly is coupled to a control circuit, in order to transform the sensing signal into a pulse width modulated signal, wherein the duty cycle of the signal is proportional to the rotation angle ratio.

7. The non-contact potentiometer according to claim 1, the power control circuit includes a first chip, the microcontroller includes a second chip, the preamplifier circuit includes a third chip, and the sensor circuit includes a fourth chip.

8. A non-contact potentiometer, comprising:
   a mechanical housing with through-holes;
   a rotatable shaft, including a top end and a magnetic end with a fixed permanent magnet, the top end can accept an external torque, to turn the rotatable shaft and the permanent magnet about a rotational axis with respect to the housing;
   a magnetoresistive sensor assembly fixed with respect to the housing, including one or more sensor chips, the sensor chips have a sensitivity axis in the plane perpendicular to the axis of rotation, and along the direction parallel to the axis of rotation, the permanent magnet is separated from the sensor chip by a predefined distance, the sensor chip senses the magnetic field of the permanent magnet as it rotates about the axis of rotation and produces a signal;
   three electrical terminals including a ground terminal, a power supply terminal, and the signal output terminal; and
   a pin configured to mechanically limit the rotation of the shaft about the axis of rotation to an angular range of less than 360°.

9. The non-contact potentiometer according to claim 8, further comprising:
   a magnetization direction in the interior of the permanent magnet perpendicular to the axial direction of the rotating shaft.

10. The non-contact potentiometer according to claim 8, further comprising:
    two sensors in the magnetoresistive sensor assembly, where sensitivity axes of the two sensors are orthogonal to each other, and perpendicular to the axis of rotation.

11. The non-contact potentiometer according to claim 8, further comprising:
    a groove cut around the periphery of the rotating rotatable shaft in a direction perpendicular to the axis of rotation, and a retaining clip disposed in the groove to restrict the motion of the rotating rotatable shaft to be only about the axis of rotation.

12. The non-contact potentiometer according to claim 8, wherein the housing that limits the rotational motion of the rotatable shaft has a bottom plate for the cylindrical housing to which the magnetoresistive sensor assembly is fixed.

13. The non-contact potentiometer according to claim 8, wherein the non-contact potentiometer magnetoresistive sensor assembly is coupled to a control circuit, in order to transform the sensing signal into a pulse width modulated signal, wherein the duty cycle of the signal is proportional to the rotation angle ratio.

14. A non-contact potentiometer, comprising:
    a mechanical housing with through-holes;
    a rotatable shaft, including a top end and a magnetic end with a fixed permanent magnet, the top end can accept an external torque, to turn the rotatable shaft and the permanent magnet about a rotational axis with respect to the housing;
    a magnetoresistive sensor assembly fixed with respect to the housing, including one or more sensor chips, the sensor chips have a sensitivity axis in the plane perpendicular to the axis of rotation, and along the direction parallel to the axis of rotation, the permanent magnet is separated from the sensor chip by a predefined distance, the sensor chip senses the magnetic field of the permanent magnet as it rotates about the axis of rotation and produces a signal;
    three electrical terminals including a ground terminal, a power supply terminal, and the signal output terminal; and
    a groove cut around the periphery of the rotating shaft in a direction perpendicular to the axis of rotation, and a retaining clip disposed in the groove to restrict the motion of the rotating shaft to be only about the axis of rotation.

15. The non-contact potentiometer according to claim 14, further comprising:
   a magnetization direction in the interior of the permanent magnet perpendicular to the axial direction of the rotating shaft.

16. The non-contact potentiometer according to claim 14, further comprising:
   two sensors in the magnetoresistive sensor assembly, where sensitivity axes of the two sensors are orthogonal to each other, and perpendicular to the axis of rotation.

17. The non-contact potentiometer according to claim 14, further comprising a pin used to limit the rotation of the rotatable shaft to less than 360°.

18. The non-contact potentiometer according to claim 14, wherein the housing that limits the rotational motion of the rotatable shaft has a bottom plate for the cylindrical housing to which the magnetoresistive sensor assembly is fixed.

19. The non-contact potentiometer according to claim 14, wherein the non-contact potentiometer magnetoresistive sensor assembly is coupled to a control circuit, in order to transform the sensing signal into a pulse width modulated signal, wherein the duty cycle of the signal is proportional to the rotation angle ratio.

20. The non-contact potentiometer according to claim 14, further comprising three electrical terminals on a portion of the printed circuit board that protrudes from the housing, the three terminals including a ground terminal, a power supply terminal, and the signal output terminal.

* * * * *